(12) United States Patent
Mohite et al.

(10) Patent No.: US 7,807,751 B2
(45) Date of Patent: Oct. 5, 2010

(54) CORE-SHELL PARTICLE, METHOD, AND COMPOSITION

(75) Inventors: Amol Adhikrao Mohite, Bangalore (IN); Sathya Narayanan Muthukrishnan, Bangalore (IN); Abhijit Som, Pune (IN)

(73) Assignee: Sabic Innovative Plastics IP B.V. (NL)

( * ) Notice: Subject to any disclaimer, the term of this patent is extended or adjusted under 35 U.S.C. 154(b) by 7 days.

(21) Appl. No.: 12/266,784

(22) Filed: Nov. 7, 2008

(65) Prior Publication Data

US 2009/0215927 A1     Aug. 27, 2009

Related U.S. Application Data

(60) Provisional application No. 61/031,080, filed on Feb. 25, 2008.

(51) Int. Cl.
*C08L 51/00*     (2006.01)
(52) U.S. Cl. .................. 525/70; 525/479; 525/902; 528/25; 524/268; 524/269
(58) Field of Classification Search ............ 524/268, 524/269; 525/70, 479, 902; 528/25
See application file for complete search history.

(56) References Cited

U.S. PATENT DOCUMENTS

| | | | |
|---|---|---|---|
| 3,220,972 A | 11/1965 | Lamoreaux | |
| 4,812,515 A | 3/1989 | Kress et al. | |
| 5,045,595 A | 9/1991 | Wang | |
| 5,200,465 A | 4/1993 | Hellstern et al. | |
| 7,015,261 B1 * | 3/2006 | Zerafati et al. | 523/201 |
| 7,153,899 B2 * | 12/2006 | Reddy et al. | 524/268 |
| 2006/0089456 A1 * | 4/2006 | Lee et al. | 525/63 |
| 2006/0148946 A1 | 7/2006 | Lee et al. | |
| 2007/0021557 A1 | 1/2007 | Lee et al. | |
| 2007/0213474 A1 * | 9/2007 | Ebenhoch et al. | 525/479 |

FOREIGN PATENT DOCUMENTS

| | | |
|---|---|---|
| EP | 0249964 A2 | 12/1987 |
| EP | 369204 A2 | 5/1990 |
| EP | 1207172 A2 | 5/2002 |
| EP | 1676871 A1 | 7/2006 |
| WO | WO 2005/108449 * | 11/2005 |

OTHER PUBLICATIONS

Hu, C.; Zhang, Y.; Li, W.; Gu, Q.; Journal of Applied Polymer Science, 105, 2571-2576, May 2007.*

Gu, S.; Kondo, T.; Konno, M.; Journal of Colloid and Interface Science, 272, 314-320, 2004.*

International Search Report and Written Opinion; International Application No. PCT/IB2009/050727; International Filing Date Feb. 23, 2009; Date of Mailing Jul. 2, 2009; 14 pages.

Mingxuan Zou et al., Preparation and characterization of core-shell polystyrene-polydimethylsiloxane particles by seeded polymerization, Polymer International, Published online Jun. 1, 2004, vol. 53, pp. 1033-1039, ISSN 0007-1641, Abstract, 2 pages.

International Searching Authority, International Search Report, PCT/US2009/034843, Date of Mailing: Oct. 12, 2009, 4 pages.

International Searching Authority, Written Opinion, PCT1US2009/034843, Date Mailed: Oct. 12, 2009, 5 pages.

J.C. Saam and D.J. Huebner, "Anionic emulsions of high molecular weight polydimethylsiloxane", 3rd Int. Conf. Surf. Colloid Sci., 1979, 166.

Warrick, et al., "Silicone Elastomer Developments 1967-1977", Rubber Chemistry and Technology, vol. 52, p. 437 ff., 1979.

J.C. Saam and D. J. Huebner, "Condensation Polymerization of Oligomeric Polydinnethylsiloxanols in Aqueous Emulsion", J. Polym. Sci., Polym. Chem. Ed., vol. 120, pp. 3351 ff., 1982.

D.W. McCarthy and J.E. Mark, "Poly(dimethylsiloxane) elastomers from aqueous emulsions: I. Preparations, and characterization of the curing and aging process", rubber Chemistry and Technology, vol. 71, p. 906 ff., 1998.

D.W. McCarthy and J.E. Mark, "Poly(dimethylsiloxane) elastomers from aqueous emulsions: III. Effects of blended silica fillers and γ-radiation-induced crosslinking", Rubber Chemistry and Technology, vol. 71, p. 941 ff., 1998.

K. Landfester, "Polyreactions in Miniemulsions", Macromol. Rapid Commun., vol. 22, pp. 896-936, 2001.

Zhang, Jiang and Yang, "Microemulsion polymerization of siloxane with nonionic surfactants as emulsifiers", J. Appl. Polym. Sci., vol. 89, pp. 3587 ff. (2003).

U.S. Appl. No. 61/031,080, Core-Shell Particle, Method, and Composition, Feb. 25, 2008.

(Continued)

*Primary Examiner*—David Wu
*Assistant Examiner*—Robert Jones, Jr.
(74) *Attorney, Agent, or Firm*—Cantor Colburn LLP

(57) ABSTRACT

A core-shell particle is formed by a method that includes forming a crosslinked polyorganosiloxane core, reacting a graftlinking agent with the crosslinked polyorganosiloxane core, and polymerizing a poly(alkenyl aromatic) shell around the graftlinking agent-functionalized polyorganosiloxane core. The method produces a core-shell particle with improved adhesion between shell and core. The core-shell particle is useful as an impact modifier in thermoplastic compositions.

24 Claims, No Drawings

OTHER PUBLICATIONS

U.S. Appl. No. 61/031,087, Core-Shell Particle, Method, and Composition, Feb. 25, 2008.

Joncryl ADR-4368 Technical Brochure, 8 pages, Jan. 25, 2008.

ISO 1133, Plastics Determination of the melt mass-flow rate (MFR) and the melt volume-flow rate (MVR) of thermoplastics, 20 pages, Jun. 5, 2001.

UL 94, Tests for Flammability of Plastic Materials for Parts in Devices and Appliances, 52 pages, Dec. 12, 2003.

ASTM D648-06, Standard Test Method for Deflection Temperature of Plastics Under Flexural Load in the Edgewise Position, 13 pages, Jul. 31, 2006.

ISO 6603-2, Plastics Determination of puncture impact behaviour of rigid plastics, Part 2: Instrumented impact testing, Oct. 1, 2000, 28 pages.

Encyclopedia of Polymer Science and Engineering, Scattering to Structural Foams, vol. 15, 5 pages, May 12, 1986.

\* cited by examiner

CORE-SHELL PARTICLE, METHOD, AND COMPOSITION

CROSS REFERENCE TO RELATED APPLICATION

This application claims the benefit of U.S. Provisional Patent Application Ser. No. 61/031,080 filed Feb. 25, 2008, which is fully incorporated herein by reference.

BACKGROUND OF THE INVENTION

Core-shell particles having a crosslinked elastomeric core and a thermoplastic shell are known. Such particles are particularly useful when blended with thermoplastics to decrease their brittleness. One class of known core-shell particles includes a crosslinked polyorganosiloxane (silicone) core and a vinyl polymer shell. These silicone impact modifier (SIM) particles have been evaluated as impact modifiers for various thermoplastics, but their utility is limited by apparently poor bonding between the particles' cores and shells. There is therefore a need for new methods of preparing SIM particles that provide improved bonding between core and shell.

BRIEF DESCRIPTION OF THE INVENTION

The above-described and other drawbacks are alleviated by a method of forming a core-shell particle, comprising: forming a crosslinked polyorganosiloxane core by copolymerizing a polydialkylsiloxane precursor and a tri- or tetraalkoxysilane in the presence of water and an emulsifying agent; forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and forming a core-shell particle by polymerizing a shell-forming monomer comprising alkenyl aromatic compound in the presence of the graftlinker-functionalized crosslinked polysiloxane core.

Another embodiment is a core-shell particle, comprising: a crosslinked polydimethylsiloxane core having a mean diameter of 70 to 150 nanometers; a shell comprising a styrene homopolymer or copolymer; and covalent linkages between the crosslinked polydimethylsiloxane core and the shell; wherein the core-shell particle has a mean diameter of 95 to 200 nanometers; and wherein the core-shell particle has a gel content of 80 to 95 percent measured after 48 hours immersion in toluene at 23° C.

Another embodiment is a thermoplastic composition, comprising: a polymer; and a core-shell particle, comprising a crosslinked polyorganosiloxane core; a shell comprising a styrene homopolymer or copolymer; and a covalent linkage between the crosslinked polyorganosiloxane core and the shell; wherein the crosslinked polydimethylsiloxane core has a diameter of 70 to 150 nanometers; wherein the core-shell particle has a mean diameter of 95 to 200 nanometers; and wherein the core-shell particle has a gel content of 80 to 95 percent measured after 48 hours immersion in toluene at 23° C.

These and other embodiments are described in detail below.

DETAILED DESCRIPTION OF THE INVENTION

The present inventors have discovered that particles with improved core-shell adhesion can be formed by a method of forming a core-shell particle, comprising: forming a crosslinked polyorganosiloxane core by copolymerizing a polydialkylsiloxane precursor and a tri- or tetraalkoxysilane in the presence of water and an emulsifying agent; forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and forming a core-shell particle by polymerizing a shell-forming monomer comprising alkenyl aromatic compound in the presence of the graftlinker-functionalized crosslinked polysiloxane core. The improved core-shell adhesion is manifested as reduced solubility of the core-shell polymers in solvents that are good solvents for the shell polymer and poor solvents for the crosslinked core polymer. Blends of the core-shell polymers with poly(arylene ether)s have been observed to exhibit an unexpected increase in tensile modulus, along with a substantial improvement in impact strength.

As mentioned above, one embodiment is a method of forming a core-shell particle, comprising: forming a crosslinked polyorganosiloxane core by copolymerizing a polydialkylsiloxane precursor and a tri- or tetraalkoxysilane in the presence of water and an emulsifying agent; forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and forming a core-shell particle by polymerizing a shell-forming monomer comprising alkenyl aromatic compound in the presence of the graftlinker-functionalized crosslinked polysiloxane core.

The polydialkylsiloxane precursor used in the first step is typically a cyclic dimethylsiloxane oligomer comprising 4 to 12 dimethylsiloxane units. Illustrative examples of such oligomers include octamethylcyclotetrasiloxane ("D4") and eicosamethylcyclodecasiloxane ("D10"). In some embodiments, the polydialkylsiloxane precursor comprises octamethylcyclotetrasiloxane (D4).

The polydialkylsiloxane precursor is copolymerized with a tri- or tetraalkoxysilane. Illustrative examples of trialkoxysilanes include methyltrimethoxysilane (CAS Reg. No. 1185-55-3), methyltriethoxysilane (2031-67-6), and mixtures thereof. Illustrative examples of tetraalkoxysilanes include tetraethoxysilane ("tetraethyl orthosilicate"; 78-10-4), tetramethoxysilane (681-84-5), tetrapropoxysilane (682-01-9), a mixtures thereof. In some embodiments, the tri- or tetraalkoxysilane comprises tetraethyl orthosilicate. Generally, the weight amount of the polydialkylsiloxane precursor is greater than the weight amount of the tri- or tetraalkoxysilane. For example, in some embodiments, the tri- or tetraalkoxysilane is used in an amount of 2 to 9 weight percent, specifically 2 to 7 weight percent, more specifically 2 to 5 weight percent, even more specifically 2 to 4 weight percent, based on the combined weight of the polydialkylsiloxane precursor and the tri- or tetraalkoxysilane. The amounts of the polydialkylsiloxane precursor and the tri- or tetraalkoxysilane can also be expressed as a ratio. For example, the polydialkylsiloxane precursor and the tri- or tetraalkoxysilane can be used in a weight ratio of 93:7 to 99:1.

The combined amount of the polydialkylsiloxane precursor and the tri- or tetraalkoxysilane can be specified as a function of total monomers. Specifically, the polydialkylsiloxane precursor and the tri- or tetraalkoxysilane can be used in amounts that sum to 30 to 80 weight percent, specifically 65 to 75 weight percent, based on the total weight of the polydialkylsiloxane precursor, the tri- or tetraalkoxysilane, the graftlinking agent, and the shell-forming monomer.

The polydialkylsiloxane precursor and the tri- or tetraalkoxysilane are copolymerized in the presence of water and an emulsifying agent. A particularly useful emulsifying agent comprises dodecylbenzenesulfonic acid and sodium dodecylbenzenesulfonate. While not wishing to be bound by any particular mechanistic hypothesis, the present inventors speculate that dodecylbenzenesulfonic acid functions as both an emulsifying agent and a polymerization catalyst. A suitable amount of the emulsifying agent is 0.6 to 1.5 weight percent, specifically 0.75 to 1.25 weight percent, based on the combined weights of the polydialkylsiloxane precursor, the tri- or tetraalkoxysilane, the graftlinking agent, and the shell-forming monomer. The amount of water can be 45 to 99 weight percent, specifically 55 to 75 weight percent, based on the combined weight of the polydialkylsiloxane precursor, the tri- or tetraalkoxysilane, the graftlinking agent, and the shell-forming monomer.

In some embodiments, formation of the crosslinked polyorganosiloxane core is conducted in two steps, which can be thought of as seed formation and seed growth. For example, the forming the crosslinked polyorganosiloxane core can comprise copolymerizing 10 to 40 weight percent, specifically 15 to 30 weight percent, of the total polydialkylsiloxane precursor and 10 to 40 weight percent, specifically 15 to 30 weight percent, of the total tri- or tetraalkoxysilane at 80 to 100° C. for 1 to 3 hours in a reaction mixture further comprising water and an emulsifying agent; and adding additional polydialkylsiloxane precursor and tri- or tetraalkoxysilane to the reaction mixture over the course of 4 to 7 hours during which the reaction mixture is maintained at 80 to 100° C.

In some embodiments, the copolymerizing a polydialkylsiloxane precursor and a tri- or tetraalkoxysilane is conducted in the absence of a graftlinking agent. The present inventors have observed that core-shell adhesion is increased if the graftlinking agent is added in a separate step, rather than as part of the reaction mixture used to form the crosslinked polyorganosiloxane core.

In some embodiments, the forming a crosslinked polyorganosiloxane core further comprises adding 5 to 40 weight percent of the total tri- or tetraalkoxysilane after the copolymerizing a polydialkylsiloxane precursor and a tri- or tetraalkoxysilane and before the forming a graftlinker-functionalized crosslinked polyorganosiloxane core.

In addition to the step of forming a crosslinked polyorganosiloxane core, the method comprises the step of forming a graftlinker-functionalized crosslinked polyorganosiloxane core by reacting the crosslinked polyorganosiloxane core with a graftlinking agent comprising an alkoxysilane group and an aliphatic carbon-carbon double or triple bond. This step is conveniently conducted without intermediate isolation of the crosslinked polyorganosiloxane core. Specific graftlinking agents that can be employed in this step include, for example, methacryloxypropyltrimethoxysilane (CAS Reg. No. 2530-85-0), methacryloxypropyltriethoxysilane (21142-29-0), methacryloxypropylmethyldimethoxysilane (14513-34-9), 3-mercaptopropyltrimethoxysilane (4420-74-0), vinyltrimethoxysilane (2768-02-7), vinyltriethoxysilane (78-08-0), vinyltris(2-methox-yethoxy)silane (1067-53-4), and mixtures thereof. In some embodiments, the graftlinking agent comprises methacryloxypropyltrimethoxysilane. The formation of the graftlinker-functionalized crosslinked polyorganosiloxane core can, optionally, be conducted in the absence of a polydialkylsiloxane precursor and a tri- or tetraalkoxysilane.

In addition to the steps of forming a crosslinked polyorganosiloxane core and forming a graftlinker-functionalized crosslinked polyorganosiloxane core, the method comprises the step of forming a core-shell particle by polymerizing a shell-forming monomer comprising alkenyl aromatic compound in the presence of the graftlinker-functionalized crosslinked polysiloxane core. The alkenyl aromatic compound can have the structure

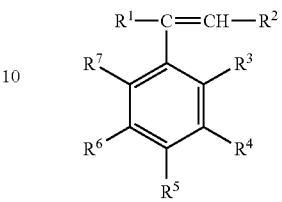

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, or a $C_1$-$C_8$ alkyl group; and $R^4$, $R^5$, and $R^6$ each independently represent a hydrogen atom, a $C_1$-$C_8$ alkyl group, or a $C_2$-$C_8$ alkenyl group, or $R^3$ and $R^4$ are taken together with the central aromatic ring to form a naphthyl group, or $R^4$ and $R^5$ are taken together with the central aromatic ring to form a naphthyl group. Specific alkenyl aromatic compounds include, for example, styrene and methylstyrenes such as alpha-methylstyrene and p-methylstyrene. In some embodiments, the alkenyl aromatic compound is styrene.

In addition to the alkenyl aromatic monomer, the shell-forming monomer can comprise other monomers copolymerizable with the alkenyl aromatic compound. Illustrative other monomers include alkyl acrylate monomers (such as, for example, methyl methacrylate, ethyl acrylate, and butyl acrylate), acrylonitrile, methacrylonitrile, and mixtures thereof.

In some embodiments, the shell-forming monomer further comprises a functionalized monomer comprising a carbon-carbon double or triple bond and at least one other functional group selected from the group consisting of hydroxy, glycidyl, and nitrile. Specific functionalized monomers include, for example, glycidyl methacrylate, 2-hydroxyethyl methacrylate, acrylonitrile, and mixtures thereof. In some embodiments, the functionalized monomer comprises glycidyl methacrylate.

In some embodiments, the shell-forming monomer is used in an amount of 20 to 60 weight percent, specifically 25 to 35 weight percent, based on the combined weight of the polydialkylsiloxane precursor, the tri- or tetraalkoxysilane, the graftlinking agent, and the shell-forming monomer.

The method is capable of producing core-shell particles having pre-determined core and total diameters. For example, in some embodiments, the core-shell particle comprises a core having a mean diameter of 70 to 150 nanometers, specifically 90 to 130 nanometers; and the core-shell particle has a mean diameter of 95 to 200 nanometers, specifically 110 to 160 nanometers.

One advantage of the method is that is produces core-shell particles having improved adhesion between the core and the shell. This adhesion can be quantified using a gel content test, which measures the solubility of the shell polymer in a solvent that is a good solvent for the shell and a poor solvent for the core. Improved core-shell adhesion is manifested as higher gel content (lower shell solubility). For example, in some embodiments, the core-shell particle has a gel content of 80 to 95 percent, specifically 90 to 95 percent, measured after 48 hours immersion in toluene at 23° C. A detailed procedure for gel content measurement is provided in the working examples, below.

In a specific embodiment of the method, the polydialkylsiloxane precursor comprises octamethylcyclotetrasiloxane; the tri- or tetraalkoxysilane comprises tetraethyl orthosilicate; the emulsifying agent comprises dodecylbenzenesulfonic acid and sodium dodecylbenzenesulfonate; the forming a crosslinked polyorganosiloxane core comprises copolymerizing 15 to 30 weight percent of the polydialkylsiloxane precursor and 15 to 30 weight percent of the tri- or tetraalkoxysilane at 80 to 100° C., specifically 80 to 95° C., for 1 to 3 hours in a reaction mixture further comprising water and an emulsifying agent; and adding the remaining polydialkylsiloxane precursor and tri- or tetraalkoxysilane to the reaction mixture over the course of 5 to 10 hours during which the reaction mixture is maintained at 80 to 95° C.; wherein the graftlinking agent comprises methacryloxypropyltrimethoxysilane; wherein the alkenyl aromatic compound comprises styrene and, optionally, glycidyl methacrylate; wherein the core-shell particle comprises a core having a mean diameter of 90 to 130 nanometers; wherein the core-shell particle has a mean diameter of 110 to 160 nanometers; and wherein the core-shell particle has a gel content of 90 to 95 percent measured after 48 hours immersion in toluene at 23° C.

One embodiment is a core-shell particle, comprising: a crosslinked polydimethylsiloxane core having a mean diameter of 70 to 150 nanometers; a shell comprising a styrene homopolymer or copolymer; and covalent linkages between the crosslinked polydimethylsiloxane core and the shell; wherein the core-shell particle has a mean diameter of 95 to 200 nanometers; and wherein the core-shell particle has a gel content of 80 to 95 percent measured after 48 hours immersion in toluene at 23° C.

In a specific embodiment of the core-shell particle, the crosslinked polydimethylsiloxane core has a mean diameter of 90 to 130 nanometers; the crosslinked polydimethylsiloxane is the product of copolymerizing reactants comprising octamethylcyclotetrasilicate and tetraethyl orthosilicate; the core-shell particle has a mean diameter of 110 to 160 nanometers; the shell is a homopolymer of styrene or a copolymer of styrene and glycidyl methacrylate; the covalent linkages are reaction products of a graftlinking agent comprising methacryloxypropyltrimethoxysilane; and the core-shell particle has a gel content of 80 to 95 percent measured after 48 hours immersion in toluene at 23° C.

Yet another embodiment is a thermoplastic composition, comprising: a polymer; and a core-shell particle, comprising a crosslinked polyorganosiloxane core, a shell comprising a styrene homopolymer or copolymer, and a covalent linkage between the crosslinked polyorganosiloxane core and the shell; wherein the crosslinked polydimethylsiloxane core has a diameter of 70 to 150 nanometers; wherein the core-shell particle has a mean diameter of 95 to 200 nanometers; and wherein the core-shell particle has a gel content of 80 to 95 percent measured after 48 hours immersion in toluene at 23° C. Suitable polymers include poly(arylene ether)s, polystyrenes, rubber-modified polystyrenes, unhydrogenated or hydrogenated block copolymers of an alkenyl aromatic compound and a conjugated diene, polyamides, polyimides, polyethers, polyetherimides, polyolefins (including olefin homopolymers and copolymers), and polyesters. These polymers are known, as are methods for their preparation, and many examples of the polymers are commercially available.

In some embodiments, the polymer comprises a poly(arylene ether), optionally in combination with one or more of the other polymers listed above. Suitable poly(arylene ether)s include those comprising repeating structural units having the formula

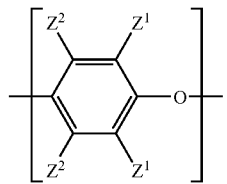

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also contain one or more carbonyl groups, amino groups, hydroxyl groups, or the like, or it may contain heteroatoms within the backbone of the hydrocarbyl residue. As one example, $Z^1$ may be a di-n-butylaminomethyl group formed by reaction of a terminal 3,5-dimethyl-1,4-phenyl group with the di-n-butylamine component of an oxidative polymerization catalyst.

In some embodiments, the poly(arylene ether) comprises 2,6-dimethyl-1,4-phenylene ether units, 2,3,6-trimethyl-1,4-phenylene ether units, or a combination thereof. In some embodiments, the poly(arylene ether) is a poly(2,6-dimethyl-1,4-phenylene ether).

The poly(arylene ether) can comprise molecules having aminoalkyl-containing end group(s), typically located in a position ortho to the hydroxy group. Also frequently present are tetramethyldiphenoquinone (TMDQ) end groups, typically obtained from 2,6-dimethylphenol-containing reaction mixtures in which tetramethyldiphenoquinone by-product is present. The poly(arylene ether) can be in the form of a homopolymer, a copolymer, a graft copolymer, an ionomer, or a block copolymer, as well as combinations comprising at least one of the foregoing.

In some embodiments, the poly(arylene ether) has an intrinsic viscosity of 0.1 to 1 deciliter per gram measured at 25° C. in chloroform. Specifically, the poly(arylene ether) intrinsic viscosity may be 0.2 to 0.8 deciliter per gram, more specifically 0.3 to 0.6 deciliter per gram, still more specifically 0.4 to 0.5 deciliter per gram.

In the thermoplastic composition, the amount of the polymer can be 50 to 99.5 weight percent, specifically 60 to 95 weight percent, more specifically 70 to 90 weight percent, based on the total weight of the thermoplastic composition. And the amount of the core-shell particle can be 0.5 to 50 weight percent, specifically 5 to 40 weight percent, more specifically 10 to 30 weight percent, based on the total weight of the thermoplastic composition.

The invention includes at least the following embodiments.

Embodiment 1: A method of forming a core-shell particle, comprising: forming a crosslinked polyorganosiloxane core by copolymerizing a polydialkylsiloxane precursor and a tri- or tetraalkoxysilane in the presence of water and an emulsifying agent; forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and forming a core-shell particle by polymerizing a shell-forming monomer comprising alkenyl aromatic compound in the presence of the graftlinker-functionalized crosslinked polysiloxane core.

Embodiment 2: The method of embodiment 1, wherein the copolymerizing a polydialkylsiloxane precursor and a tri- or tetraalkoxysilane is conducted in the absence of a graftlinking agent.

Embodiment 3: The method of embodiment 1 or 2, wherein the polydialkylsiloxane precursor and the tri- or tetraalkoxysilane are used in amounts that sum to 30 to 80 weight percent based on the total weight of the polydialkylsiloxane precursor, the tri- or tetraalkoxysilane, the graftlinking agent, and the shell-forming monomer.

Embodiment 4: The method of any of embodiments 1-3, wherein the reacting the crosslinked polyorganosiloxane core with a graftlinking agent is conducted in the absence of a polydialkylsiloxane precursor and a tri- or tetraalkoxysilane.

Embodiment 5: The method of any of embodiments 1-4, wherein the polydialkylsiloxane precursor and the tri- or tetraalkoxysilane are used in a weight ratio of 93:7 to 99:1.

Embodiment 6: The method of any of embodiments 1-5, wherein the forming a crosslinked polyorganosiloxane core comprises copolymerizing 10 to 40 weight percent of the total polydialkylsiloxane precursor and 10 to 40 weight percent of the total tri- or tetraalkoxysilane at 80 to 100° C. for 1 to 3 hours in a reaction mixture further comprising water and an emulsifying agent; and adding additional polydialkylsiloxane precursor and tri- or tetraalkoxysilane to the reaction mixture over the course of 4 to 7 hours during which the reaction mixture is maintained at 80 to 100° C.

Embodiment 7: The method of any of embodiments 1-6, wherein the forming a crosslinked polyorganosiloxane core further comprises adding 5 to 40 weight percent of the total tri- or tetraalkoxysilane after the copolymerizing a polydialkylsiloxane precursor and a tri- or tetraalkoxysilane and before the forming a graftlinker-functionalized crosslinked polyorganosiloxane core.

Embodiment 8: The method of any of embodiments 1-7, wherein the shell-forming monomer further comprises a functionalized monomer comprising a carbon-carbon double or triple bond and at least one other functional group selected from the group consisting of hydroxy, glycidyl, and nitrile.

Embodiment 9: The method of embodiment 8, wherein the functionalized monomer is selected from the group consisting of glycidyl methacrylate, 2-hydroxyethyl methacrylate, acrylonitrile, and mixtures thereof.

Embodiment 10: The method of embodiment 8, wherein the functionalized monomer comprises glycidyl methacrylate.

Embodiment 11: The method of any of embodiments 1-10, wherein the emulsifying agent comprises dodecylbenzenesulfonic acid and sodium dodecylbenzenesulfonate.

Embodiment 12: The method of any of embodiments 1-11, wherein the emulsifying agent is used in an amount of 0.6 to 1.5 weight percent based on the combined weights of the polydialkylsiloxane precursor, the tri- or tetraalkoxysilane, the graftlinking agent, and the shell-forming monomer.

Embodiment 13: The method of any of embodiments 1-12, wherein the water is used in an amount of 45 to 99 weight percent based on the combined weight of the polydialkylsiloxane precursor, the tri- or tetraalkoxysilane, the graftlinking agent, and the shell-forming monomer.

Embodiment 14: The method of any of embodiments 1-13, wherein the polydialkylsiloxane precursor comprises a cyclic dimethylsiloxane oligomer or polymer comprising 4 to 12 dimethylsiloxane units.

Embodiment 15: The method of any of embodiments 1-14, wherein the polydialkylsiloxane precursor comprises octamethylcyclotetrasiloxane.

Embodiment 16: The method of any of embodiments 1-15, wherein the tri- or tetraalkoxysilane is selected from the group consisting of tetraethyl orthosilicate, methyltrimethoxysilane, methyltriethoxysilane, tetramethoxysilane, tetrapropoxysilane, and mixtures thereof.

Embodiment 17: The method of any of embodiments 1-16, wherein the tri- or tetraalkoxysilane comprises tetraethyl orthosilicate.

Embodiment 18: The method of any of embodiments 1-17, wherein the tri- or tetraalkoxysilane is used in an amount of 2 to 9 weight percent based on the combined weight of the polydialkylsiloxane precursor and the tri- or tetraalkoxysilane.

Embodiment 19: The method of any of embodiments 1-18, wherein the graftlinking agent is selected from the group consisting of methacryloxypropyltrimethoxysilane, methacryloxypropyltriethoxysilane, methacryloxypropylmethyldimethoxysilane, 3-mercaptopropyltrimethoxysilane, vinyltrimethoxysilane, vinyltriethoxysilane, vinyltris(2-methoxyethoxy)silane, and mixtures thereof.

Embodiment 20: The method of any of embodiments 1-19, wherein the graftlinking agent comprises methacryloxypropyltrimethoxysilane.

Embodiment 21: The method of any of embodiments 1-20, wherein the shell-forming monomer is used in an amount of 20 to 60 weight percent based on the combined weight of the polydialkylsiloxane precursor, the tri- or tetraalkoxysilane, the graftlinking agent, and the shell-forming monomer.

Embodiment 22: The method of any of embodiments 1-21, wherein the core-shell particle comprises a core having a mean diameter of 70 to 150 nanometers; and wherein the core-shell particle has a mean diameter of 95 to 200 nanometers.

Embodiment 23: The method of any of embodiments 1-22, wherein the core-shell particle has a gel content of 80 to 95 percent measured after 48 hours immersion in toluene at 23° C.

Embodiment 24: The method of claim 1, wherein the polydialkylsiloxane precursor comprises octamethylcyclotetrasiloxane; wherein the tri- or tetraalkoxysilane comprises tetraethyl orthosilicate; wherein the emulsifying agent comprises dodecylbenzenesulfonic acid and sodium dodecylbenzenesulfonate; wherein the forming a crosslinked polyorganosiloxane core comprises copolymerizing 15 to 30 weight percent of the polydialkylsiloxane precursor and 15 to 30 weight percent of the tri- or tetraalkoxysilane at 80 to 100° C. for 1 to 3 hours in a reaction mixture further comprising water and an emulsifying agent; and adding the remaining polydialkylsiloxane precursor and tri- or tetraalkoxysilane to the reaction mixture over the course of 5 to 10 hours during which the reaction mixture is maintained at 80 to 95° C.; wherein the graftlinking agent comprises methacryloxypropyltrimethoxysilane; wherein the alkenyl aromatic compound comprises styrene; wherein the core-shell particle comprises a core having a mean diameter of 90 to 130 nanometers; wherein the core-shell particle has a mean diameter of 110 to 160 nanometers; and wherein the core-shell particle has a gel content of 90 to 95 percent measured after 48 hours immersion in toluene at 23° C.

Embodiment 25: The method of embodiment 24, wherein the polymerizing an alkenyl aromatic compound comprises copolymerizing styrene and glycidyl methacrylate.

Embodiment 26: A core-shell particle, comprising: a crosslinked polydimethylsiloxane core having a mean diameter of 70 to 150 nanometers; a shell comprising a styrene homopolymer or copolymer; and covalent linkages between the crosslinked polydimethylsiloxane core and the shell; wherein the core-shell particle has a mean diameter of 95 to 200 nanometers; and wherein the core-shell particle has a gel content of 80 to 95 percent measured after 48 hours immersion in toluene at 23° C.

Embodiment 27: The core-shell particle of embodiment 26, wherein the crosslinked polydimethylsiloxane core has a mean diameter of 90 to 130 nanometers; wherein the crosslinked polydimethylsiloxane is the product of copolymerizing reactants comprising octamethylcyclotetrasiloxane and tetraethyl orthosilicate; wherein the core-shell particle has a mean diameter of 110 to 160 nanometers; wherein the shell is a homopolymer of styrene or a copolymer of styrene and glycidyl methacrylate; wherein the covalent linkages are reaction products of a graftlinking agent comprising methacryloxypropyltrimethoxysilane; and wherein the core-shell particle has a gel content of 80 to 95 percent measured after 48 hours immersion in toluene at 23° C.

Embodiment 28: A thermoplastic composition, comprising: a polymer; and a core-shell particle, comprising a crosslinked polyorganosiloxane core; a shell comprising a styrene homopolymer or copolymer; and a covalent linkage between the crosslinked polyorganosiloxane core and the shell; wherein the crosslinked polydimethylsiloxane core has a diameter of 70 to 150 nanometers; wherein the core-shell particle has a mean diameter of 95 to 200 nanometers; and wherein the core-shell particle has a gel content of 80 to 95 percent measured after 48 hours immersion in toluene at 23° C.

Embodiment 29: The thermoplastic composition of embodiment 28, wherein the polymer comprises a poly(arylene ether).

Embodiment 30: The thermoplastic composition of claim 28, wherein the polymer comprises a poly(arylene ether) and at least one additional polymer selected from the group consisting of polystyrenes, rubber-modified polystyrenes, unhydrogenated or hydrogenated block copolymers of an alkenyl aromatic compound and a conjugated diene, polyamides, polyimides, polyethers, polyetherimides, polyolefins, and polyesters.

The invention is further illustrated by the following non-limiting examples.

EXAMPLE 1

Reactants used to form the silicone impact modifiers are listed in Table 1.

TABLE 1

| Name or Abbreviation | Description |
| --- | --- |
| D4 | Octamethylcyclotetrasiloxane, CAS Reg. No. 556-67-2; obtained from Momentive Performance Materials |
| TEOS | Tetraethyl orthosilicate, CAS Reg. No. 78-10-4; obtained from Aldrich with nominal 98% purity |
| MPTMS | Methacryloxypropyltrimethoxysilane, CAS Reg. No. 2530-85-0; obtained from Gelest |
| MePTMS | Mercaptopropyltrimethoxysilane, CAS Reg. No. 4420-74-0; obtained from Sigma-Aldrich |
| Styrene | Styrene, CAS Reg. No. 78-10-4; obtained from Sigma-Aldrich with nominal 99+% purity |
| DBSA | Dodecylbenzenesulfonic acid, CAS Reg. No. 27176-87-0; obtained from Fluka as a mixture of isomers having a nominal purity of ca. 90% |
| SDBSA | Sodium dodecylbenzenesulfonate, CAS Reg. No. 25155-30-0; obtained from Fluka as a mixture of homologous alkylbenzenesulfonates having a nominal purity of ca. 80% |
| PPS | Potassium persulfate, CAS Reg. No. 7727-21-1; obtained from S.D. Fine Chemicals with nominal 98% purity |
| SBC | Sodium bicarbonate, CAS Reg. No. 144-55-8; obtained from Ranbaxy Fine Chemicals, RANKEM grade |
| Sodium carbonate | Sodium carbonate, CAS Reg. No. 497-19-8; obtained from Thomas Baker |
| Calcium chloride | Calcium chloride, CAS Reg. No. 10043-52-4; obtained from Merck with nominal 98% purity |
| GMA | Glycidyl methacrylate, CAS Reg. No. 106-91-2; obtained from Aldrich |

The overall process for this example can be divided in steps (A) to (D).

Step (A): Core Nucleation

The step involves the synthesis of a crosslinked polydimethylsiloxane core from D4 in aqueous emulsion using DBSA (catalyst/emulsifier), SDBSA (emulsifier), and TEOS (crosslinker). The detailed procedure is described below.

Polymerization was carried out in a 2-liter, four-necked round bottomed flask equipped with a reflux condenser, electrical heater with heat sensor, oil bath, overhead stirrer with glass stirring rod, nitrogen gas inlet, and dropping funnel.

The round bottomed flask was initially charged with the emulsifying agent mixture: DBSA, 3 grams (1% with respect to total monomers which is D4+TEOS+MPTMS) and SDBSA, 3 grams (1% with respect to total monomers) solution in distilled water. The solution was heated to 90° C. with continuous stirring. D4, 57 grams (20% of total D4) and TEOS 1.2 grams (20% of Total TEOS) were fed to the round bottomed flask. The reaction was continued at 90° C. for 2 hours with agitation at 300 rpm. The composition of the initial reaction is given in Table 2, where "DM water" refers to demineralized water.

TABLE 2

| Ingredients | Part A (g) |
|---|---|
| D4 | 57 |
| TEOS | 1.2 |
| MPTMS | — |
| DBSA | 3.0 |
| SDBSA | 3.0 |
| DM Water | 450 |

Step (B): Core Growth

The next step involves building the particle size of the crosslinked polydimethylsiloxane core by further addition of D4 and TEOS. The amount of additional D4 was 228 grams (80% of the total D4 feed). Similarly the amount of additional TEOS was 4.8 grams (80% of the total TEOS feed). This addition was conducted over a span of 2 hours at 90° C. with continuous stirring at 300 rpm. After completion of addition, the reaction was continued for an additional 3 hours. The TEOS addition in steps (A) and (B) not only crosslinks the PDMS core but also generates in situ silica particles in the core.

Step (C): Graftlinking Agent Incorporation

Before incorporation of the graftlinking agent MPTMS, an extra step of TEOS addition was carried out in between step (B) and step (C). Thirty grams of TEOS were rapidly added to the reaction mixture and the reaction was continued for 4 hours at 60° C. This step was followed by MPTMS incorporation, which was conducted by addition of 9 grams of MPTMS (3% of total monomer). The reaction to incorporate the graftlinking agent was carried out at 70° C. for 2 hours.

Step (D): Shell Synthesis

Five hundred (500) grams of the above MPTMS-incorporated core was taken for polystyrene shell grafting. The composition of the reactants was decided based on the percentage of solids obtained in the previous step. The amount of styrene was calculated to be equal by weight to the amount of MPTMS incorporated into the crosslinked polydimethylsiloxane core. The polymerization was carried out in the presence of potassium persulfate (0.7 weight percent based on styrene) and sodium bicarbonate (0.7 weight percent based on styrene). Water was added prior to the start of the reaction to bring the total amount of water to 70% of the total weight of the reaction mixture. The composition of the reactants is given in Table 3.

TABLE 3

| Ingredients | Mass (g) |
|---|---|
| MPTMS-incorporated core | 177.81 (75%) |
| Styrene | 59.27 (25%) |
| DM Water (Present + Added) | 330 + 25.4 |
| PPS | 0.4 |
| SBC | 0.4 |

The actual shell-forming procedure was as follows. The MPTMS-incorporated, crosslinked silicone latex and the initiator mixture (PPS and SBC) were combined in the round bottomed flask. The temperature of the flask was raised to 75° C. and the reactants were stirred at 300 rpm. Drop-wise addition of the styrene monomer was carried out using dropper funnel for a period of 2 hours. After addition of styrene, the reaction mixture was stirred at 75° C. for another 3 hours. The resulting latex was cooled to room temperature, and the latex particles were separated from the aqueous phase through coagulation with a calcium chloride solution. Specifically, 3,000 grams of a 1% calcium chloride solution was charged in a stainless steel vessel at 75° C. with agitation at 700 rpm. The styrene grafted silicone stable latex was poured into the stainless steel vessel containing the salt solution to break the latex and produce a powder. The resultant powder was filtered, washed thoroughly with water, and dried at 65-80° C. for 48 hours.

COMPARATIVE EXAMPLE 1

This example explores the effect of adding a graftlinking agent (in this case MePTMS) during core formation and growth, instead of after core formation and growth. In this example, the composition after steps (A) and (B) is given in Table 4.

TABLE 4

| Component | Mass (g) | Relative Amount |
|---|---|---|
| D4 | 156.6 | collectively, 40% based on |
| TEOS | 6.8 | total composition |
| MePTMS | 6.8 | |
| DM Water | 1276.5 | 60% based on total composition |
| DBSA | 8.51 | 1% based on total monomers |
| SDBSA | 8.51 | 1% based on total monomers |

The rest of the 80% of the D4/TEOS/MePTMS was added in step (B). The amounts of these three ingredients were 626.6 grams D4, 27.2 grams TEOS, and 27.2 grams MePTMS. The amounts of TEOS and MPTMS were 4% each, based on the total weight of monomer (D4+TEOS+MPTMS). The weight percent concentration in the styrene-grafting step was 90% for the crosslinked polydimethylsiloxane core and the 10% for the styrene. Compared to the four-step procedure of Example 1, this example used a different graftlinking agent, omitted step (C), and incorporated the graftlinking agent addition into steps (A) and (B).

EXAMPLE 2

The experiment differs from Example 1 in several ways, including the step (A) ratio of total solids to water, and the relative amounts of styrene and graftlinker-functionalized core in step (D). The composition of the final step of styrene synthesis is given in Table 5.

TABLE 5

| Component | Mass (g) |
|---|---|
| MPTMS-incorporated core | 180 (50%) |
| Styrene | 180 (50%) |
| DM Water | 320 + 220 |
| PPS | 1.26 |
| SBC | 1.26 |
| SDBSA | 1.26 |

EXAMPLE 3

This example differs from Example 2 in that the amount of additional TEOS added before MPTMS incorporation was 60 grams instead of 30 grams. The composition of the final step of styrene synthesis is given in Table 6. Additional reaction details are given in Table 7.

TABLE 6

| Component | Mass (g) | Relative Amount |
|---|---|---|
| MPTMS-incorporated core | 270 | collectively, 40% of total mass |
| Styrene | 270 | |
| DM Water | 760 | 60% of total mass |
| PPS | 1.9 | 0.7% vs. styrene |
| SBC | 1.9 | 0.7% vs. styrene |

EXAMPLES 4 AND 5

This experiment illustrates generation of a functionalized polystyrene shell. Functionalized polystyrene shells can improve the compatibility of the core-shell particle with some polymer matrices in which the core-shell particle is used as an impact modifier.

As in Example 2, additional TEOS was added between steps (B) and (C). The amount of additional TEOS was 30 grams in Example 4 and 90 grams in Example 5. In contrast to the use of styrene alone in the last step of Examples 1, 2, and 3 and Comparative Example 1, these examples used a combination of styrene and glycidyl methacrylate in a weight ratio of 20:1. The combined styrene and glycidyl methacrylate were added over the course of 2 hours, and followed by 3 hours of reaction at 75° C. When the isolated core-shell particles were analyzed by Fourier transform infrared spectroscopy (FT-IR), incorporation of glycidyl methacrylate was verified by the presence of an absorption at 1728 cm$^{-1}$, corresponding to the carbonyl group of the incorporated glycidyl methacrylate.

The compositions and procedures of Examples 1-5 and Comparative Example 1 are compared in Table 7. In Table 7, "120 nm X-PDMS" is an abbreviation for a crosslinked polydimethylsiloxane core having a diameter of approximately 120 nm.

Properties of the crosslinked silicone cores and the final core-shell polymers are summarized in Table 8. Particle sizes were measured by dynamic light scattering using a HORIBA LB500 instrument, 650 nm laser diode, 5 milliwatts power, and a photocell detector. The instrument is switched on and the cleanliness of the quartz cell is checked by running a blank run with demineralized water. After the cell check, a drop of emulsion (0.05 mL) is taken in the cell and diluted with about 5-10 ml of water. The diluted solution is placed in the cell holder and the lid of the test chamber is closed. Refractive index of the dispersant (water) dispersed medium (PDMS) is fed as an input parameter The particle size and distribution is measured using the dynamic light scattering experiment. The particle size values presented in Table 8 represent the mean particle size.

Gel content and percent soluble values were determined as follows. Ten grams (initial weight) of the core-shell polymer sample was added to a conical flask and 200 milliliters of toluene was added to it. The resulting mixture was well stirred for few minutes and left without further agitation for 24 hours. After 24 hours, the toluene soluble portion was carefully removed from the gel by filtration. The remaining gel was then dried under vacuum for a minimum 10 hours at 70° C. and the final weight was measured. Gel content and percent soluble values were calculated according to the following equations:

Gel Content (%)=100×(final weight)/(initial weight)

Percent Soluble (%)=100−[100×(final weight)/(initial weight)].

The low percent soluble values for Examples 1-5 indicate good anchorage of the polystyrene or polystyrene/glycidyl methacrylate shell to the crosslinked polydimethylsiloxane core. In contrast, the relatively high percent solubles value for Comparative Example 1 illustrates the problem of poor core-shell anchorage associated with a method in which graft linker is incorporated during core formation.

TABLE 7

| | Ex. 1 | C. Ex. 1 | Ex. 2 | Ex. 3 | Ex. 4 | Ex. 5 |
|---|---|---|---|---|---|---|
| Reagents | | | | | | |
| Step (A) | | | | | | |
| D4 | 57 g | 156.6 g | 38 g | 76 g | 57 g | 57 g |
| TEOS | 1.2 g | 6.8 g | 0.8 g | 1.6 g | 1.2 g | 1.2 g |
| MePTMS | 0 g | 6.8 g | 0 g | 0 g | 0 g | 0 g |
| DBSA | 3 g | 8.51 g | 2 g | 4 g | 3 g | 3 g |
| SDBSA | 3 g | 8.51 g | 2 g | 4 g | 3 g | 3 g |
| Water | 450 g | 1276.5 g | 300 g | 600 g | 450 g | 450 g |
| Step (B) | | | | | | |
| D4 | 228 g | 626.4 g | 152 g | 304 g | 228 g | 228 g |
| TEOS | 4.8 g | 27.2 g | 3.2 g | 6.4 g | 4.8 g | 4.8 g |
| MePTMS | 0 g | 27.2 g | 0 g | 0 g | 0 g | 0 g |
| Between Steps (B) & (C) | | | | | | |
| TEOS | 30 g | 0 g | 30 g | 60 g | 30 g | 90 g |
| Step (C) | | | | | | |
| MPTMS | 9 g | 0 g | 6 g | 12 g | 9 g | 9 g |
| Step (D) | | | | | | |
| 120 nm X-PDMS | 177.81 g | 390.2 g | 180 g | 270 g | 201 g | 201 g |
| Styrene | 59.27 g | 42.78 g | 180 g | 270 g | 67 g | 67 g |

TABLE 7-continued

| | | | | | | |
|---|---|---|---|---|---|---|
| GMA | 0 g | 0 g | 0 g | 0 g | 3.35 g | 3.35 g |
| SDBSA | 0 g | 2.3 g | 1.26 g | 1.9 g | 0 g | 0 g |
| PPS | 0.4 g | 3.2 g | 1.26 g | 1.9 g | 0.5 g | 0.5 g |
| SBC | 0.4 g | 3.2 g | 1.26 g | 1.9 g | 0.5 g | 0.5 g |
| Total water (present + added) | 330.2 g + 25.4 g | 695 g | 320 g + 220 g | 480 g_280 g | 371.4 g + 28.6 g | 373.3 g + 33.73 g |
| Temperatures | | | | | | |
| Step (A) | 80-95° C. | 80-95° C. | 80-95° C. | 80-95° C. | 80-95° C. | 80-95° C. |
| Step (B) | 60-90° C. | 60-90° C. | 60-90° C. | 60-90° C. | 60-90° C. | 60-90° C. |
| Step (C) | 75-90° C. | — | 75-90° C. | 75-90° C. | 75-90° C. | 75-90° C. |
| Step (D) | 70-80° C. | 70-80° C. | 70-80° C. | 70-80° C. | 70-80° C. | 70-80° C. |
| Times | | | | | | |
| Step (A) | 1.5-3 hours | 1.5-3 hours | 1.5-3 hours | 1.5-3 hours | 1.5-3 hours | 1.5-3 hours |
| Step (B) | 5-10 hours | 5-7 hours | 5-10 hours | 5-10 hours | 5-10 hours | 5-10 hours |
| Step (C) | 2-4 hours | — | 2-4 hours | 2-4 hours | 2-4 hours | 2-4 hours |
| Step (D) | 4-7 hours | 4-7 hours | 4-7 hours | 4-7 hours | 4-7 hours | 4-7 hours |

TABLE 8

| | Ex. 1 | C. Ex. 1 | Ex. 2 | Ex. 3 | Ex. 4 | Ex. 5 |
|---|---|---|---|---|---|---|
| X-PDMS Core Particle Size | — | — | 110 nm | 123 nm | 112 nm | 130 nm |
| MPTMS-incorporated X-PDMS | — | — | — | — | 120 | — |
| Core-Shell Particle | — | — | — | — | 133 | — |
| Percent Soluble | — | 29% | 6% | — | 7% | 6% |
| Gel Content | — | 71% | 94% | — | 93% | 94% |

EXAMPLES 6 AND 7, COMPARATIVE EXAMPLES 2-4

These examples illustrate the incorporation of the core-shell particles into thermoplastic compositions. The materials used in these examples are summarized in Table 9.

TABLE 9

| Name or Abbreviation | Description |
|---|---|
| PPE | Poly(2,6-dimethyl-1,4-phenylene ether) having an intrinsic viscosity of 0.33 dl/g available as PPO 808 from SABIC Innovative Plastics |
| SEBS G1650 | Polystyrene-poly(ethylene-butylene)-polystyrene triblock copolymer (CAS. Reg. No. 66070-58-4) having a polystyrene content of 30 weight percent, available as KRATON G1650 from Kraton Polymers. |
| SEBS Tuftec | Polystyrene-poly(ethylene-butylene)-polystyrene triblock copolymer (CAS Reg. No. 66070-58-4) having a polystyrene content of 67 weight percent, available as TUFTEC H1043 from Asahi Polymers. |
| Ex. 3 CSP | Core-shell particle as prepared in Example 3 |

Examples 6 and 7 and Comparative Examples 2-4 illustrate the effects of impact modifier type and amount on the physical properties of poly(arylene ether) blends. Compositions are summarized in Table 10.

The compositions were compounded using a co-rotating 25-millimeter twin-screw extruder with a length-to-screw diameter ratio, L/D, of about 40:1. The extruder included ten barrels having temperatures, from upstream to downstream, of 150, 220, 240, 255, 255, 265, 265, 275, 275, and 280° C. All components were added to the feedthroat of the extruder. The screw rotation rate was 300 rpm and the throughput was about 15 kilograms per hour. Tensile bars and impact specimens were molded on a 60 ton injection molding machine using temperatures of about 275-300° C.

Property values are summarized in Table 10. Elasticity modulus (expressed in megapascals), tensile stress values at yield and break (expressed in megapascals), and tensile strain values at yield and break (expressed in percent) were measured at 23° C. according to ISO 527. Notched Izod impact strengths (expressed in kilojoules per meter-squared) were measured at 23° C. according to ISO 180. All values are express as mean i standard deviation based on testing of five samples per composition.

The results show that Example 6 with addition of the Example 3 core-shell particle to poly(arylene ether) at 20% of the total composition resulted in improved notched impact strength and elongation at break compared to Comparative Example 1 with no impact modifier. Surprisingly, Example 6 exhibited an increased elasticity modulus relative to Comparative Example 1. This is surprising because the addition of impact modifier to a thermoplastic composition typically decreases elasticity modulus. The more typical behavior was observed in Comparative Examples 2 and 3 with SEBS block copolymers, where elasticity modulus was decreased relative to Comparative Example 1 without impact modifier.

TABLE 10

| | C. Ex. 2 | C. Ex. 3 | C. Ex. 4 | Ex. 6 | Ex. 7 |
|---|---|---|---|---|---|
| Compositions | | | | | |
| 0.33 IV PPE | 100 | 80 | 80 | 80 | 99 |
| SEBS G1650 | 0 | 20 | 0 | 0 | 0 |
| Tuftec | 0 | 0 | 20 | 0 | 0 |
| Ex. 3 CSP | 0 | 0 | 0 | 20 | 1 |

TABLE 10-continued

|  | C. Ex. 2 | C. Ex. 3 | C. Ex. 4 | Ex. 6 | Ex. 7 |
|---|---|---|---|---|---|
| Properties |  |  |  |  |  |
| Elasticity Modulus (MPa) | 2532 ± 46 | 2000 ± 89 | 2141 ± 9 | 2811 ± 64 | 3195 ± 91 |
| Tensile stress at yield (MPa) | 70.4 ± 4.8 | 57.6 ± 0.3 | 62.9 ± 0.3 | 61.7 ± 0.1 | 76.1 ± 0.8 |
| Tensile strain at yield (%) | 4.5 ± 0.8 | 5.8 ± 0.2 | 5.5 ± 0.2 | 4.9 ± 0.1 | 5.7 ± 0.03 |
| Tensile stress at break (MPa) | 67.1 ± 4.8 | 43.5 ± 1.3 | 46.4 ± 0.3 | 51.5 ± 0.7 | 57.9 ± 0.9 |
| Tensile strain at break (%) | 4.6 ± 0.9 | 12.5 ± 2.4 | 13.5 ± 0.9 | 19.7 ± 1.9 | 17.6 ± 1.6 |
| Notched Izod (kJ/m$^2$) | 1.9 ± 0.2 | 17.0 ± 1.2 | 7.2 ± 0.6 | 19.8 ± 0.5 | 1.9 ± 0.2 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of forming a core-shell particle, comprising:
   forming a crosslinked polyorganosiloxane core by copolymerizing a polydialkylsiloxane precursor and a tri- or tetraalkoxysilane in the presence of water and an emulsifying agent;
   forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and
   forming a core-shell particle by polymerizing a shell-forming monomer comprising alkenyl aromatic compound in the presence of the graftlinker-functionalized crosslinked polysiloxane core;
   wherein the water is used in an amount of 45 to 99 weight percent based on the combined weight of the polydialkylsiloxane precursor, the tri-or tetraalkoxysilane, the graftlinking agent, and the shell-forming monomer.

2. The method of claim 1, wherein the copolymerizing a polydialkylsiloxane precursor and a tri- or tetraalkoxysilane is conducted in the absence of a graftlinking agent.

3. The method of claim 1, wherein the polydialkylsiloxane precursor and the tri- or tetraalkoxysilane are used in amounts that sum to 30 to 80 weight percent based on the total weight of the polydialkylsiloxane precursor, the tri- or tetraalkoxysilane, the graftlinking agent, and the shell-forming monomer.

4. The method of claim 1, wherein the reacting the crosslinked polyorganosiloxane core with a graftlinking agent is conducted in the absence of a polydialkylsiloxane precursor and a tri- or tetraalkoxysilane.

5. The method of claim 1, wherein the polydialkylsiloxane precursor and the tri- or tetraalkoxysilane are used in a weight ratio of 93:7 to 99:1.

6. The method of claim 1, wherein the forming a crosslinked polyorganosiloxane core comprises copolymerizing 10 to 40 weight percent of the total polydialkylsiloxane precursor and 10 to 40 weight percent of the total tri- or tetraalkoxysilane at 80 to 100° C. for 1 to 3 hours in a reaction mixture further comprising water and an emulsifying agent; and
   adding additional polydialkylsiloxane precursor and tri- or tetraalkoxysilane to the reaction mixture over the course of 4 to 7 hours during which the reaction mixture is maintained at 80 to 100° C.

7. The method of claim 1, wherein the forming a crosslinked polyorganosiloxane core further comprises adding 5 to 40 weight percent of the total tri- or tetraalkoxysilane after the copolymerizing a polydialkylsiloxane precursor and a tri- or tetraalkoxysilane and before the forming a graftlinker-functionalized crosslinked polyorganosiloxane core.

8. The method of claim 1, wherein the shell-forming monomer further comprises a functionalized monomer comprising a carbon-carbon double or triple bond and at least one other functional group selected from the group consisting of hydroxy, glycidyl, and nitrile.

9. The method of claim 8, wherein the functionalized monomer is selected from the group consisting of glycidyl methacrylate, 2-hydroxyethyl methacrylate, acrylonitrile, and mixtures thereof.

10. The method of claim 8, wherein the functionalized monomer comprises glycidyl methacrylate.

11. The method of claim 1, wherein the emulsifying agent comprises dodecylbenzenesulfonic acid and sodium dodecylbenzenesulfonate.

12. The method of claim 1, wherein the emulsifying agent is used in an amount of 0.6 to 1.5 weight percent based on the combined weights of the polydialkylsiloxane precursor, the tri- or tetraalkoxysilane, the graftlinking agent, and the shell-forming monomer.

13. The method of claim 1, wherein the polydialkylsiloxane precursor comprises a cyclic dimethylsiloxane oligomer or polymer comprising 4 to 12 dimethylsiloxane units.

14. The method of claim 1, wherein the polydialkylsiloxane precursor comprises octamethylcyclotetrasiloxane.

15. The method of claim 1, wherein the tri- or tetraalkoxysilane is selected from the group consisting of tetraethyl orthosilicate, methyltrimethoxysilane, methyltriethoxysilane, tetramethoxysilane, tetrapropoxysilane, and mixtures thereof.

16. The method of claim 1, wherein the tri- or tetraalkoxysilane comprises tetraethyl orthosilicate.

17. The method of claim 1, wherein the tri- or tetraalkoxysilane is used in an amount of 2 to 9 weight percent based on the combined weight of the polydialkylsiloxane precursor and the tri- or tetraalkoxysilane.

18. The method of claim 1, wherein the graftlinking agent is selected from the group consisting of methacryloxypropyltrimethoxysilane, methacryloxypropyltriethoxysilane, methacryloxypropylmethyldimethoxysilane, 3-mercaptopropyltrimethoxysilane, vinyltrimethoxysilane, vinyltriethoxysilane, vinyltris(2-methoxyethoxy)silane, and mixtures thereof.

19. The method of claim 1, wherein the graftlinking agent comprises methacryloxypropyltrimethoxysilane.

20. The method of claim 1, wherein the shell-forming monomer is used in an amount of 20 to 60 weight percent based on the combined weight of the polydialkylsiloxane precursor, the tri- or tetraalkoxysilane, the graftlinking agent, and the shell-forming monomer.

21. The method of claim 1, wherein the core-shell particle comprises a core having a mean diameter of 70 to 150 nanometers; and
wherein the core-shell particle has a mean diameter of 95 to 200 nanometers.

22. The method of claim 1, wherein the core-shell particle has a gel content of 80 to 95 percent measured after 48 hours immersion in toluene at 23° C.

23. A method of forming a core-shell particle, comprising:
forming a crosslinked polyorganosiloxane core by copolymerizing a polydialkylsiloxane precursor and a tri- or tetraalkoxysilane in the presence of water and an emulsifying agent;
forming a graftlinker-functionalized crosslinked polyorganosiloxane core by reacting the crosslinked polyorganosiloxane core with a graftlinking agent comprising an alkoxysilane group and an aliphatic carbon-carbon double or triple bond; and
forming a core-shell particle by polymerizing a shell-forming monomer comprising alkenyl aromatic compound in the presence of the graftlinker-functionalized crosslinked polysiloxane core;
wherein the polydialkylsiloxane precursor comprises octamethylcyclotetrasiloxane;
wherein the tri- or tetraalkoxysilane comprises tetraethyl orthosilicate;
wherein the emulsifying agent comprises dodecylbenzenesulfonic acid and sodium dodecylbenzenesulfonate;
wherein the forming a crosslinked polyorganosiloxane core comprises copolymerizing 15 to 30 weight percent of the polydialkylsiloxane precursor and 15 to 30 weight percent of the tri- or tetraalkoxysilane at 80 to 100° C. for 1 to 3 hours in a reaction mixture further comprising water and an emulsifying agent; and
adding the remaining polydialkylsiloxane precursor and tri- or tetraalkoxysilane to the reaction mixture over the course of 5 to 10 hours during which the reaction mixture is maintained at 80 to 95° C.;
wherein the graftlinking agent comprises methacryloxypropyltrimethoxysilane;
wherein the alkenyl aromatic compound comprises styrene;
wherein the core-shell particle comprises a core having a mean diameter of 90 to 130 nanometers;
wherein the core-shell particle has a mean diameter of 110 to 160 nanometers; and
wherein the core-shell particle has a gel content of 90 to 95 percent measured after 48 hours immersion in toluene at 23° C.

24. The method of claim 23, wherein the polymerizing an alkenyl aromatic compound comprises copolymerizing styrene and glycidyl methacrylate.

* * * * *